United States Patent [19]

Leckband et al.

[11] 4,264,238

[45] Apr. 28, 1981

[54] APPARATUS FOR SEPARATING PARTICLES OF TOBACCO OR THE LIKE FROM A GASEOUS CARRIER MEDIUM

[75] Inventors: Uwe Leckband, Hamburg; Rolf Schmidt, Glinde, both of Fed. Rep. of Germany

[73] Assignee: Hauni-Werke Körber & Co. KG., Hamburg, Fed. Rep. of Germany

[21] Appl. No.: 81,156

[22] Filed: Oct. 2, 1979

[30] Foreign Application Priority Data

Oct. 6, 1978 [DE] Fed. Rep. of Germany ....... 2843673

[51] Int. Cl.³ ...................... B65G 53/46; B65G 53/64
[52] U.S. Cl. ..................................... 406/62; 406/171; 406/172
[58] Field of Search ................. 406/62, 168, 169, 171, 406/172

[56] References Cited

U.S. PATENT DOCUMENTS

| 452,552 | 5/1891 | Eberhardt | 406/62 X |
| 521,159 | 6/1894 | Garraux | 406/62 |

FOREIGN PATENT DOCUMENTS

| 302412 | 12/1928 | United Kingdom | 406/171 |
| 335259 | 9/1930 | United Kingdom | 406/62 |

Primary Examiner—James L. Rowland
Attorney, Agent, or Firm—Peter K. Kontler

[57] ABSTRACT

The discharge end of a supply conduit for a mixture of tobacco particles and air communicates with the top portion of a hollow cylindrical housing for a driven cell wheel whose cells are subdivided into inner and outer chambers by impermeable partitions. The outer chamber of each preceding cell communicates with the inner chamber of the respective next-following cell by way of a sieve which forms part of the corresponding vane of the cell wheel. The outlet for tobacco particles is disposed at the lowermost point of the housing and communicates with successive outer chambers, the same as the discharge end of the supply conduit. A suction pipe for evacuation of gaseous carrier medium has an intake end which is coaxial with the wheel and communicates with successive inner chambers at a level above the axis of the wheel so that the inner chambers of cells whose outer chambers discharge tobacco particles into the outlet are sealed from the suction pipe. The discharge end of the supply conduit has a wall portion which deflects particles of tobacco onto successive partitions of the wheel. A pipe for admission of compressed air which cleans the sieves communicates with successive inner chambers in the region of the outlet for tobacco particles.

17 Claims, 3 Drawing Figures

APPARATUS FOR SEPARATING PARTICLES OF TOBACCO OR THE LIKE FROM A GASEOUS CARRIER MEDIUM

BACKGROUND OF THE INVENTION

The present invention relates to apparatus for separating particulate material, such as tobacco shreds, from a gaseous carrier medium. More particularly, the invention relates to improvements in apparatus of the type known as air locks wherein a cell wheel rotates in a housing to move successive cells past the discharge end of a conduit for a mixture of particulate material and carrier medium, wherein the carrier medium is withdrawn by a suction pipe, and wherein the particulate material leaves the housing through a discrete outlet. Such apparatus are normally utilized to admit particles of tobacco into the magazine of a machine for the processing of tobacco. The magazine receives particles of tobacco from a remote source by way of a pneumatic conduit wherein the particles are transported in a stream of air or another suitable gaseous carrier medium. Sieves are disposed between the intake end of the suction pipe and the cells of the rotating wheel to intercept the particles of tobacco while permitting the carrier medium to flow into the suction pipe. Typical examples of machines whose magazines receive tobacco by way of the above outlined apparatus are cigarette makers wherein the magazine supplies particles of shredded or otherwise comminuted tobacco to a distributor which converts the particles into a shower and thereupon into a narrow stream ready to be equalized and draped into a web of cigarette paper or other suitable wrapping material. The resulting continuous cigarette rod is subdivided into plain cigarettes of desired length.

As a rule, the air lock is disposed directly above the magazine of a maker of cigarettes, cigars or cigarillos. It is desirable to ensure complete separation of tobacco particles from the gaseous carrier medium. This is necessary in order to enable the maker to form a continuous rod-like tobacco filler of predictable consistency.

British Pat. No. 335,259 discloses an air lock wherein a housing confines a rotary cell wheel as well as a rotary drum-shaped sieve. The sieve segregates the carrier medium from tobacco particles, and the cell wheel removes the particles from the housing. The sieve is disposed above the cell wheel; therefore, the housings of such air locks are rather bulky and the air locks must be provided with means for rotating the cell wheel as well as with means for transmitting torque to the rotary sieve.

OBJECTS AND SUMMARY OF THE INVENTION

An object of the invention is to provide a novel and improved apparatus which separates particulate material from a gaseous carrier medium and is simpler, more compact and less expensive than heretofore known apparatus.

Another object of the invention is to provide an apparatus wherein a single rotary component suffices to segregate the carrier medium from the particulate material as well as to expel the separated particulate material from the housing.

A further object of the invention is to provide an air lock wherein the cell wheel is constructed and assembled in a novel and improved way.

An additional object of the invention is to provide an air lock which can be installed in existing makers of cigarettes, cigars or cigarillos as a superior substitute for conventional air locks.

Another object of the invention is to provide an air lock wherein the clogging of parts which separate the gaseous carrier medium from particulate material is or can be prevented in a simple and time-saving manner.

A further object of the invention is to provide an air lock whose throughput is at least as high as that of conventional air locks even though the dimensions of the improved air lock are but a fraction of the dimensions of heretofore known air locks.

Another object of the invention is to provide an air lock wherein the separation of a gaseous carrier medium from particulate material is at least as thorough and predictable as in heretofore known air locks.

One feature of the invention resides in the provision of an apparatus for separating particulate material, especially particles of shredded tobacco, from a gaseous carrier medium (normally air). The apparatus comprises a preferably cylindrical housing, a cell wheel which is rotatably mounted in the housing (preferably in such a way that it rotates about a substantially horizontal axis) and includes a plurality of preferably radially outwardly extending vanes and cells disposed between neighboring vanes, a conduit which serves for admission of a mixture of carrier medium and particulate material and has a discharge end communicating with the interior of the housing to deliver the mixture into successive cells of the wheel when the latter is driven to rotate in a predetermined direction, an outlet which serves for evacuation of particulate material and communicates with successive cells downstream of the discharge end of the conduit, as considered in the direction of rotation of the wheel, and a suction pipe which serves to withdraw gaseous carrier medium from the housing and has an intake end communicating with at least one cell intermediate the discharge end of the conduit and the outlet for particulate material. The wheel includes foraminous portions (e.g., sieves which can form part of the vanes) serving to permit gaseous carrier medium to flow into the intake end of the suction pipe but to intercept the particulate material.

The wheel preferably further comprises partitions or other suitable means for dividing each cell into an inner and an outer chamber. The inner chambers communicate with the outer chambers of neighboring cells by way of the aforementioned sieves, and successive inner chambers also communicate with the intake end of the suction pipe. The outer chambers receive particulate material from the discharge end of the supply conduit and communicate seriatim with the outlet for particulate material.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
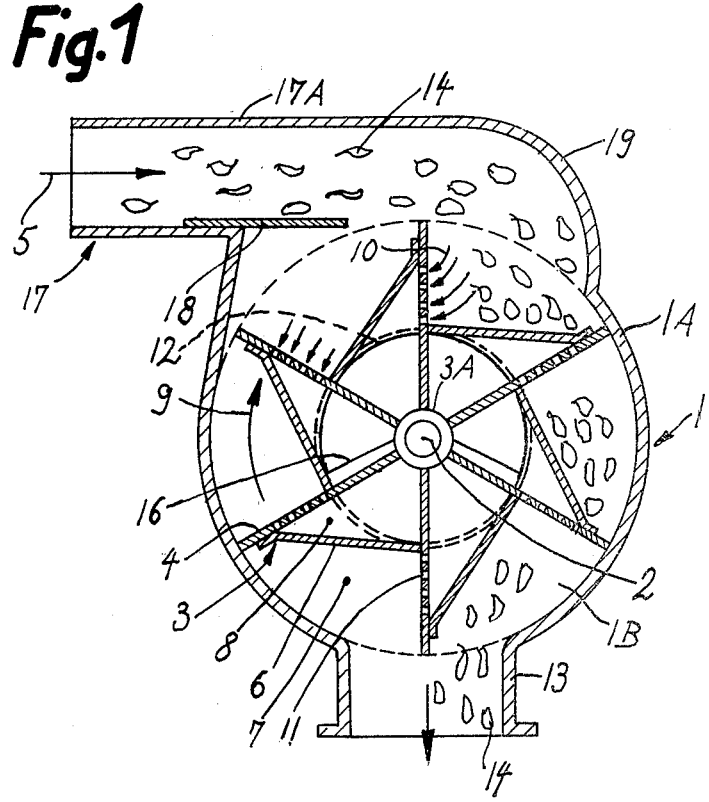
FIG. 1 is a vertical sectional view of an apparatus which embodies one form of the invention.

FIG. 1 illustrates an apparatus wherein particles 14 of tobacco (e.g., tobacco shreds) are separated from a gaseous carrier medium (hereinafter called air). A mixture of air and particles 14 is supplied by a conduit 17 in the direction indicated by arrow 5. The discharge end 17A of the supply conduit 17 communicates with the topmost portion of the cylindrical wall 1A of a hollow drum-shaped housing 1 for a rotary cell wheel 3. The means for driving the wheel 3 about a substantially horizontal axis (which is also the axis of the housing 1) includes a shaft 2 which receives torque from the prime mover of a maker of cigarettes, cigars or cigarillos, e.g., from the prime mover of a cigarette making machine of the type known as GARANT (manufactured by the assignee of the present application).

The lowermost portion of the cylindrical wall 1A of the housing 1 carries a downward (radially) extending tubular outlet 13 for evacuation of segregated tobacco particles 14. An end wall 1B of the housing 1 is connected with the intake end of a suction pipe 12 (indicated by broken lines) which serves to evacuate the segregated air stream from the housing. The shaft 2 rotates the cell wheel 3 in the direction which is indicated by the arrow 9. The intake end of the suction pipe 12 is coaxial with the housing 1 and cell wheel 3.

The cell wheel 3 comprises a hub 3A which rotates with the shaft 2 and supports several (e.g., six) radially outwardly extending vanes or blades 4 whose outer end portions slide along or are closely adjacent to the internal surface of the cylindrical wall 1A to insure that the cells between neighboring vanes 4 are separated from each other in the region of the tips of the vanes. Each cell is subdivided into an outer chamber 7 and an inner chamber 8 by one of six partitions 6 which are substantially tangential to the intake end of the suction pipe 12 and substantially normal to the next-following vanes 4. The front end portion of each partition 6 is adjacent to the outermost portion of the preceding vane 4 (as considered in the direction of arrow 9), and the rear end portion of each partition is adjacent to the median portion of the next-following vane 4. Those (outer) portions 11 of the vanes 4 which extend between the rear end portions of the preceding partitions 6 (again, as considered in the direction of arrow 9) and the front end portions of the next-following partitions 6 are foraminous and constitute sieves which permit the air to flow from the outer chambers 7 into the next-following inner chambers 8 but intercept the particles 14. The partitions 6 are not permeable to air. A fixedly mounted or adjustable sheet metal barrier 16 is provided in or on the end wall 1B (or forms part of such end wall) to seal the lower portion of the intake end of the suction pipe 12 from those inner chambers 8 which are adjacent to the outlet 13 for tobacco particles 14. Nevertheless, the intake end of the pipe 12 can communicate with successive inner chambers 8 intermediate the outlet 13 and the discharge end 17A of the conduit 17. Consequently, the pipe 12 withdraws air from the oncoming inner chambers 8 before such inner chambers advance into the region of the outlet 13 so that suction in the chambers 8 decreases or is terminated at the time the corresponding and/or neighboring outer chambers 7 discharge tobacco particles 14 into the outlet 13.

The discharge end 17A of the supply conduit 17 comprises an arcuate deflecting portion 19 which directs the mixture of air and tobacco particles 14 into successive outer chambers 7 in such a way that the particles advance substantially at right angles to and toward the non-permeable partitions 6. At the same time, the respective inner chambers 8 communicate with the intake end of the pipe 12 so that the pipe 12 draws air from the outer chambers 7 into the next-following inner chambers 8. This is indicated by the arrows 10. The reference character 18 denotes a baffle which extends into a portion of the opening for admission of the mixture of air and tobacco particles 14 into the housing 1. The baffle 18 prevents premature entry of particles 14 into the oncoming outer chambers 7, namely, into those outer chambers wherein the particles 14 would impinge upon (and possibley clog) the sieves 11 rather than upon the non-permeable partitions 6. It will be noted that the partitions 6 which receive particles 14 from the discharge end 17A of the conduit 17 are horizontal or nearly horizontal. This further reduces the likelihood of clogging of the interstices, pores or perforations of the sieves 11 with tobacco particles because the air which flows into the inner chamber 8 of the next-following cell is deflected by approximately 90 degrees (in a direction to the left, as viewed in FIG. 1) whereas the particles 14 accumulate on the substantially horizontal partition 6 and are caused to move toward the internal surface of the cylindrical wall 1A and thereupon into the outlet 13 as the cell wheel 3 rotates in the clockwise direction.

The apparatus of FIG. 1 need not employ a discrete cell wheel and a discrete rotary sieve. This is due to the fact that the sieves 11 form part of the cell wheel 3 and that the cell wheel performs two important functions, namely, the separation of air from tobacco particles 14 via sieves 11 and the transport of particles 14 toward and the dumping of such particles into the outlet 13 (by the partitions 6). Furthermore, the intake end of the suction pipe 12 draws air directly from (the inner chambers 8 of) the cells between the radial vanes 4. In view of the absence of a separate rotary sieve, the housing 1 of the improved apparatus is much more compact than the housings of the aforedescribed conventional apparatus which are disclosed in British Pat. No. 335,259. More particularly, the height of the housing 1 is a fraction of the height of housings in conventional apparatus and, therefore, such housing can be readily installed in all kinds of existing machines for the processing of particulate material which is delivered by one or more pneumatic conveyors in a stream of a gaseous carrier medium.

The mounting of partitions 6 in such a way that they are normal or nearly normal to the next-following vanes 4 is desirable and advantageous because this renders it possible to assure more reliable separation of air from tobacco particles 14 and reduces the likelihood of clogging of the sieves 11. As explained above, the partitions 6 which receive particles 14 from the discharge end 17A of the supply conduit 17 are substantially horizontal and the next-following sieves 11 are substantially vertical. Therefore, particles of tobacco which would be likely to clog the sieves 11 during their descent from the discharge end 17A would have to change the direction of their movement through 90 degrees. Such change in direction can be readily achieved by the air streams which flow in the direction of arrows 10 but not by the particles 14. The baffle 18 also reduces the likelihood of clogging of sieves 11 because it prevents the particles 14 from leaving the discharge end 17A of the supply conduit 17 at a time when they would impinge upon the sieves 11 rather than upon the impermeable partitions 6. However, the baffle 18 is preferably installed in such a way that it allows some air to enter an oncoming outer chamber 7 (to be drawn into the next-following inner chamber 8) before the open outer end of such outer chamber 7 reaches the deflecting portion 19 of the discharge end 17A. Tangential mounting of the discharge end 17A with reference to the wall 1A also reduces the likelihood of clogging of the sieves 11 with particles of tobacco.

The barrier 16 contributes to reliable evacuation of all tobacco particles 14 by gravity flow as soon as the respective outer chambers 7 begin to communicate with the outlet 13. This is due to the fact that the inner chambers 8 which move toward and past the outlet 13 are temporarily sealed form the intake end of the suction pipe 12. Such mounting of the barrier 16 does not interfere with reliable evacuation of large quantities of gaseous carrier medium because such evacuation begins immediately after the outermost portion of an outer chamber 7 advances beyond the baffle 18. In the embodiment of FIG. 1, the barrier 16 extends along an arc of approximately 120 degrees, namely, at an angle of approximately 60 degrees to both sides of the vertical plane which includes the axes of the shaft 2 and outlet 13.

Figure 2:
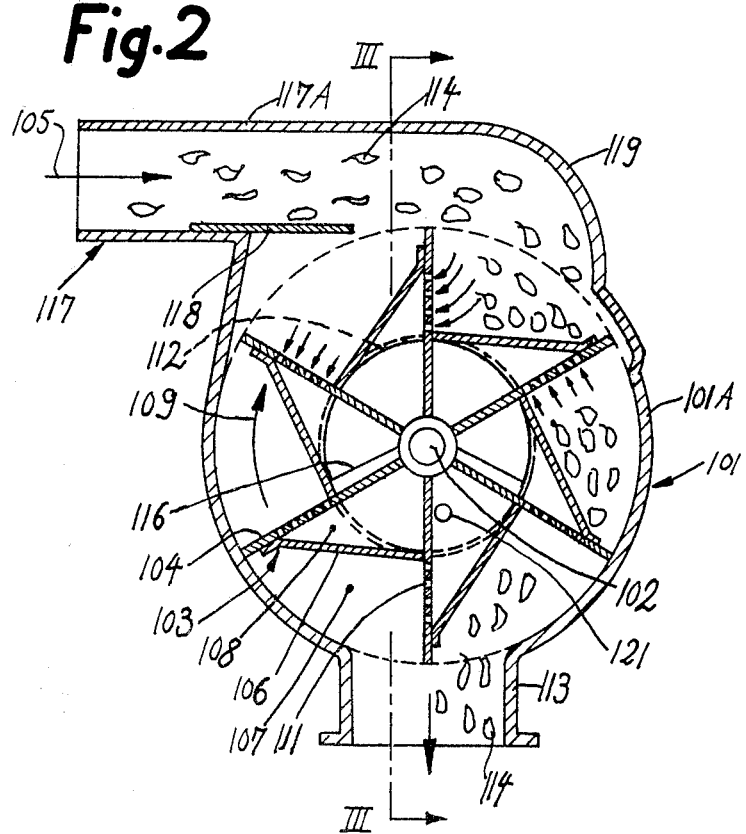
FIG. 2 is a similar sectional view of a modified apparatus.
Figure 3:
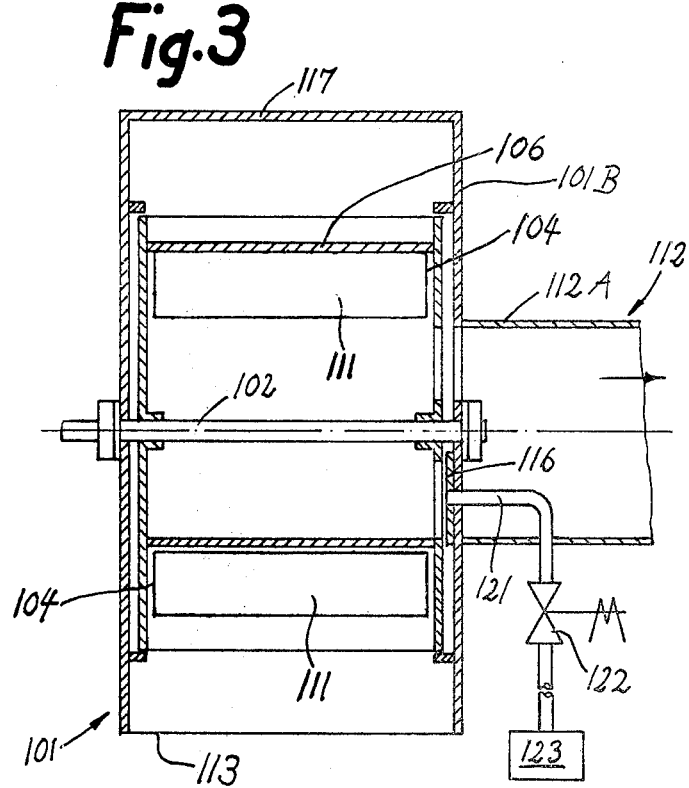
FIG. 3 is a sectional view as seen in the direction of arrows from the line III—III of FIG. 2.

FIGS. 2 and 3 illustrate a modified apparatus wherein all such parts which are identical with or clearly analogous to corresponding parts of the apparatus of FIG. 1 are denoted by similar reference characters plus 100. The main difference between the two apparatus is that the apparatus of FIGS. 2 and 3 comprises a further conduit or pipe 121 which is connected to a source 123 of compressed gas (preferably air) and contains an adjustable flow regulating valve 122, preferably a solenoid-operated valve which can be actuated from one or more remote locations at the will of an attendant. The discharge end of the pipe 121 extends through the barrier 116 to admit compressed air into those inner chambers 108 which advance toward and/or past the outlet 113. The valve 122 can be actuated by hand; to this end, the valve 122 is installed in that portion of the pipe 121 which extends through the wall of and outwardly from the intake end 112A of the suction pipe 112. Compressed air which issues from the pipe 121 causes the particles 114 which have accumulated at the outer sides of the sieves 111 to descend into the outlet 113. The provision of pipe 121 and valve 122 is especially desirable when the apparatus is to be used for separation of air from two or more different brands of comminuted tobacco. Clogging of sieves 11 or 111 is more likely when the mixture which is supplied by the conduit 17 or 117 contains a certain type of tobacco or when the configuration and/or size of particles is such that the particles will tend to clog the pores, interstices or perforations of the sieves. Moreover, clogging of the sieves 11 or 111 is likely to occur when the apparatus is in uninterrupted use for extended periods of time. The attendant can open the valve 122 at regular or irregular intervals. Also, the valve 122 can be opened automatically at selected intervals by a timer or the like.

The illustrated mounting of the discharge end of the pipe 121 (i.e., so that the discharge end extends inwardly through the barrier 116) is desirable and advantageous because the stream of compressed air issuing from the pipe 121 is less likely to interfere with the flow of separated air stream from the inner chambers 108 and into the suction pipe 112.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

We claim:

1. Apparatus for separating particulate material, especially particles of tobacco, from a gaseous carrier medium, comprising a housing; a wheel rotatably mounted in said housing and including a plurality of vanes and cells disposed between neighboring vanes, said vanes extending substantially radially of the axis of the wheel and said wheel further including means for dividing each of said cells into an outer chamber and an inner chamber; a conduit for admission of a mixture of particulate material and carrier medium, said conduit having a discharge end communicating with the interior of said housing to deliver the mixture into successive cells when said wheel rotates; an outlet for particulate material, said outlet being provided on said housing and communicating with successive cells downstream of said discharge end, as considered in the direction of rotation of said wheel; and a suction pipe for withdrawing the carrier medium from said housing, said pipe having an intake end communicating with at least one cell intermediate said discharge end and said outlet, said wheel also including foraminous portions which permit the carrier medium to flow into said intake end but intercept the particulate material, said foraminous portions including sieves which are disposed between said inner and outer chambers and said inner chambers communicating with said intake end when said wheel rotates.

2. The apparatus of claim 1, wherein said housing includes a hollow cylinder.

3. The apparatus of claim 1, wherein each of said sieves is disposed between the outer chamber of a first cell and the inner chamber of a second cell which is immediately adjacent to the first cell.

4. The apparatus of claim 3, wherein said second cell is located upstream of said first cell, as considered in the direction of rotation of said wheel.

5. The apparatus of claim 1, wherein said dividing means comprises partitions which are substantially normal to the neighboring vanes.

6. The apparatus of claim 5, wherein said sieves form part of said vanes.

7. The apparatus of claim 1, wherein said outlet is disposed at a level below said intake and discharge ends, and further comprising a barrier for sealing said intake end from the inner chambers of those cells which communicate with said outlet.

8. The apparatus of claim 1, wherein said discharge end extends substantially tangentially of said wheel.

9. The apparatus of claim 1, wherein said housing includes a hollow cylinder which is substantially coaxial with said wheel and said discharge end is substantially tangential to said cylinder.

10. The apparatus of claim 1, wherein said discharge end includes means for deflecting particulate material of the mixture which is supplied by said conduit substantially radially inwardly of said wheel.

11. The apparatus of claim 1, wherein said intake end is coaxial with said wheel and said housing has an internal surface along which said vanes sweep to separate said cells from each other when said wheel rotates.

12. The apparatus of claim 11, further comprising drive means for rotating said wheel in a predetermined direction.

13. Apparatus for separating particulate material, especially particles of tobacco, from a gaseous carrier medium, comprising a housing; a wheel rotatably mounted in said housing and including a plurality of vanes and cells disposed between neighboring vanes, said wheel further including means for dividing said cells into inner and outer chambers; a conduit for admission of a mixture of particulate material and carrier medium, said conduit having a discharge end communicating with the interior of said housing to deliver the mixture into successive cells when said wheel rotates, said discharge end including means for deflecting particulate material of the mixture which is supplied by said conduit substantially radially inwardly of said wheel and to direct particulate material of said mixture into successive outer chambers and against the respective dividing means when said wheel rotates; an outlet for particulate material, said outlet being provided on said housing and communicating with successive cells downstream of said discharge end, as considered in the direction of rotation of said wheel; and a suction pipe for withdrawing the carrier medium from said housing, said pipe having an intake end communicating with at least one cell intermediate said discharge end and said outlet, said wheel including foraminous portions which permit the carrier medium to flow into said intake end but intercept the particulate material.

14. Apparatus for separating particulate material, especially particles of tobacco, from a gaseous carrier medium, comprising a housing; a wheel rotatably mounted in said housing and including a plurality of vanes and cells disposed between neighboring vanes, said wheel further including means for dividing said cells into inner and outer chambers; a conduit for admission of a mixture of particulate material and carrier medium, said couduit having a discharge end communicating with the interior of said housing to deliver the mixture into successive cells when said wheel rotates; an outlet for particulate material, said outlet being provided on said housing and communicating with successive cells downstream of said discharge end, as considered in the direction of rotation of said wheel; a suction pipe for withdrawing the carrier medium from said housing, said pipe having an intake end communicating with at least one cell intermediate said discharge end and said outlet, said wheel including foraminous portions which permit the carrier medium to flow into said intake end but intercept the particulate material, said foraminous portions constituting sieves disposed between the inner and outer chambers of said wheel, said outer chambers being arranged to recieve the mixture from said discharge end and said inner chambers being arranged to communicate with said intake end when said wheel rotates; and means for admitting a compressed gas into successive inner chambers.

15. The apparatus of claim 14, wherein said outlet is disposed below said intake end and said intake end is disposed below said discharge end, said means for admitting comprising a pipe which discharges into successive inner chambers in the region of said outlet.

16. The apparatus of claim 14, further comprising valve means for regulating the flow of compressed gas through said admitting means and into said inner chambers.

17. The apparatus of claim 14, further comprising a barrier for sealing the inner chambers which are adjacent to said outlet from said intake end, said means for admitting comprising a pipe extending through said barrier.

* * * * *